Nov. 3, 1970  S. R. SHORTES  3,537,876

PHOSPHORS FOR COLOR DISPLAY SYSTEMS

Original Filed May 28, 1965

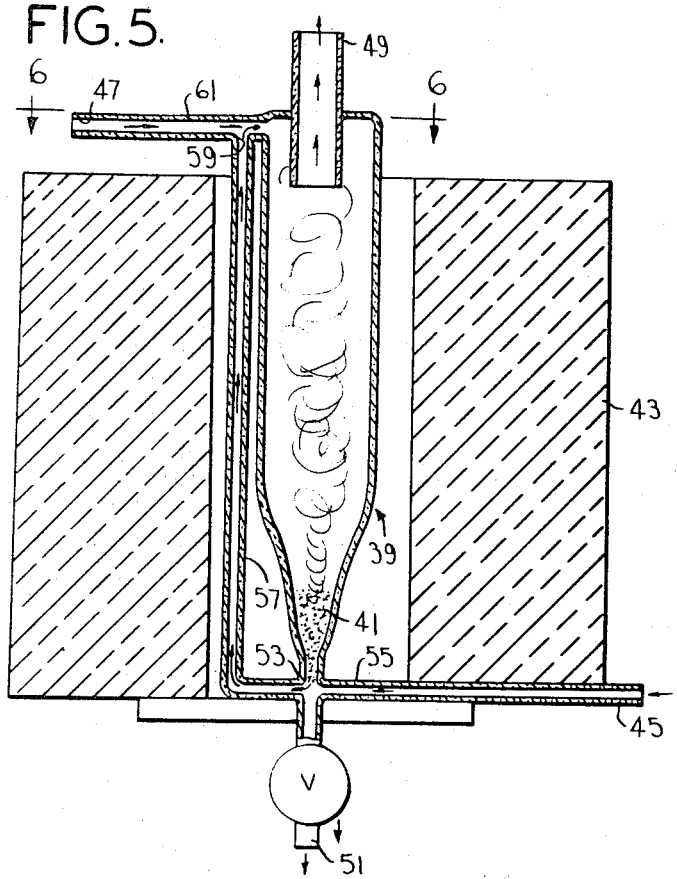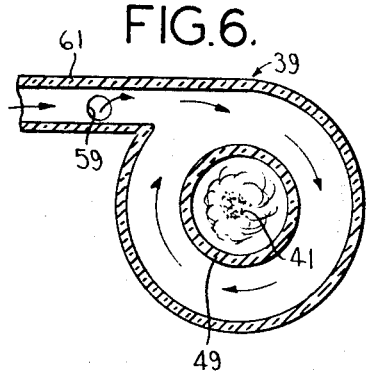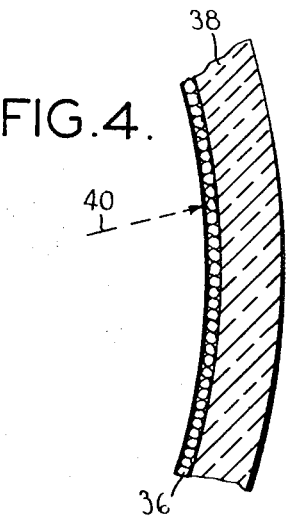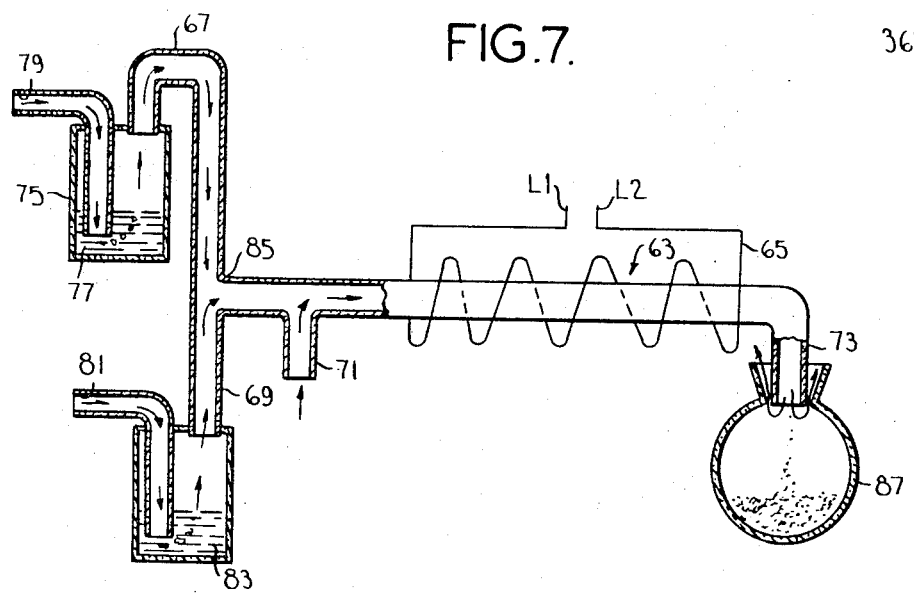

Nov. 3, 1970   S. R. SHORTES   3,537,876
PHOSPHORS FOR COLOR DISPLAY SYSTEMS
Original Filed May 28, 1965   3 Sheets-Sheet 3

United States Patent Office 3,537,876
Patented Nov. 3, 1970

---

3,537,876
PHOSPHORS FOR COLOR DISPLAY SYSTEMS
Samuel R. Shortes, Dallas, Tex., assignor to Texas Instruments Incorporated, Dallas, Tex., a corporation of Delaware
Original application May 28, 1965, Ser. No. 459,582, now Patent No. 3,408,223. Divided and this application May 13, 1968, Ser. No. 751,630
Int. Cl. H01j 31/20
U.S. Cl. 117—33.5   6 Claims

ABSTRACT OF THE DISCLOSURE

Disclosed is a viewing screen for use in a color display system, the screen being composed of two or more different phosphors each emitting light of a different color and at least one of the phosphors having a surface layer thereon which constitutes a partial barrier to electrons whereby phosphor particles having the surface layer requires an electron beam of a velocity greater than an uncoated phosphor in order to excite phosphor causing light to emit therefrom.

---

This is a division of application Ser. No. 459,582 filed May 28, 1965, now Pat. No. 3,408,223.

This invention relates to phosphors for color display systems, and more particularly to such phosphors which have increased electron energization thresholds and to methods and apparatus for making such phosphors.

Among the several objects of this invention may be noted the provision of phosphors for use in making viewing screens for color display systems in which image colors are controlled by varying the energy level or velocity of an electron beam; the provision of simple, economical and reliable methods of making such phosphors; the provision of such methods by which are formed on phosphor particles electron retarding surface barriers which are relatively independent of the size of the phosphor particles and the distribution of size thereof; the provision of methods of the class described in which phosphor particles of different color light emitting properties may be provided with closely controlled electron energization thresholds and do not require exceptionally high voltage differentials for excitation thereof; and the provision of apparatus for increasing the energization threshold of phosphor particles. Others objects and features will be in part apparent and in part pointed out hereinafter.

Briefly, this invention is directed to methods of increasing the electron energization or beam energy threshold of phosphor particles by suspending particles of any of the conventional phosphors in a gaseous medium which includes a material in vapor phase which will coat the particles with an electron retarding surface barrier, and condensing this material on the surface of these particles to form a surface barrier layer. Various exemplary gaseous mediums include oxygen and vaporized tetraethoxysilane and/or vaporized tin chloride to form particle barrier coatings of silicon dioxide and/or tin oxide. The methods of this invention also include exposing phosphor particles to a gaseous medium including oxygen and a material in vapor phase, such as aluminum oxide (e.g., formed by heating a vaporized mixture of aluminum isopropylate and oxygen) or tin oxide (e.g., formed by heating a vaporized mixture of water, tin chloride and oxygen), and condensing these oxide materials on the surfaces of the particles to form surface barrier layers. Further, this invention is directed to apparatus including means for settling the phosphor particles downwardly through the heated gaseous medium, preferably along a generally spiral path, and recirculating the phosphor particles repetitively through the gaseous medium thereby to form a barrier layer on the surfaces of each phosphor particle which increases in thickness during each pass through the gaseous medium. Also, encompassed by this invention are viewing screens for color display systems which include particles of a first phosphor which emit light of a first color when excited by a beam of electrons having a velocity of at least a first predetermined value, and particles of a second phosphor having a surface layer which constitutes a partial barrier to electrons whereby the second phosphor particles have a higher electron energization threshold than that of the first phosphor particles. The surface layers of these second phosphor particles comprise coatings of a condensed vapor phase material and these second phosphor particles therefore emit light of a second color when excited by a beam of electrons having a velocity of a second predetermined value which is greater than said first value.

The invention accordingly comprises the constructions, products and methods hereinafter described, the scope of the invention being indicated in the following claims.

In the accompanying drawings, in which several of various possible embodiments of the invention are illustrated, FIG. 1 illustrates apparatus of the present invention for forming phosphor particles with increased electron energization thresholds;

FIG. 4 illustrates a portion of a viewing screen of a color display system employing phosphor particles having increased energization thresholds;

FIG. 5 illustrates another apparatus for forming phosphor particles with increased beam energy thresholds in accordance with methods of this invention;

FIG. 6 is a cross sectional view on line 6—6 of FIG. 5;

FIG. 7 shows a further embodiment of apparatus utilized in accordance with the present invention;

Corresponding reference characters indicate corresponding parts throughout the several views of the drawings.

Figure 1:
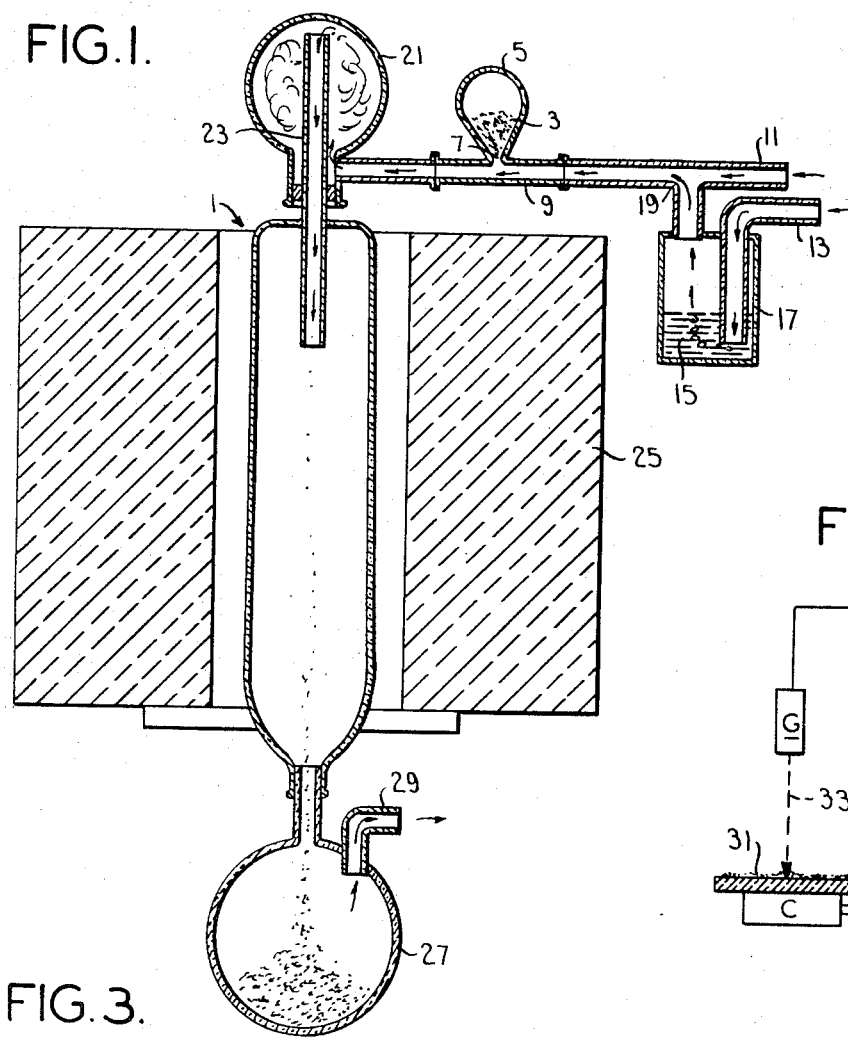

In recently developed color display systems, electron viewing screens are employed which include phosphor particles of different color light-emitting characteristics and which are respectively differently responsive to electrons of differing energies or velocities. In such systems, the viewing screen includes a first phosphor (e.g., one which emits light of relatively long wavelengths such as red) which is energized to emit light when struck by electrons having at least a first predetermined velocity or beam energy level, for example, accelerated by a kinescope accelerating voltage of about 3 kv. The viewing screen also includes particles of a second phosphor, e.g., one which emits a second color light of shorter wavelengths, and preferably complementary in color to that of the first phosphor (such as a cyan colored light), when energized by electrons having at least a second and higher predetermined velocity, e.g., 4 kv. if a beam of electrons of the lower velocity has its current modulated in accordance with the red record represented by the red color information signal derived in the receiver of any conventional color television receiver (such as those operating in accordance with the NTSC, SECAM or PAL systems), a red color image corresponding to the red record is presented on the viewing screen of the kinescope. At electron velocities lower than 4 kv., the second or cyan light emitting phosphor will not be significantly energized to emit light. By current modulating a beam of electrons having a beam energy of 4 kv. with the green record represented by the receiver's green color information signal, both the first and second phosphors will be concurrently energized to produce a white or substantially achromatic light. Thus red and white images are produced on the viewing screen either continuously or alternately, by two electron beams moving in registry in a raster scanning pattern across the viewing screen. These images combine to form a composite image which subjectively appears to include a full range of hues including those which are not actually present in a colorimetric sense. Such a two color system of presenting full color images is known in the art and provides images of pleasing appearance in which the hues appear more saturated than would be expected. Such a system is described in further detail U.S. Pat. 3,371,153, issued Feb. 27, 1968.

To obtain an even more desirable color display, a viewing screen is employed which also includes particles of a third phosphor having a higher beam energy threshold, e.g., one which emits light of a third color (e.g., blue) only when energized by electrons having a higher velocity, e.g., 5 kv. A beam of such an energy level modulated in accordance with the blue record represented by the blue color information signal of the television receiver, will energize all three phosphors and produce a third image of cooler achromatic light, and provide a composite image of particularly pleasing color. A more detailed description of such systems may be found in the copending and coassigned application Ser. No. 450,705, filed Apr. 26, 1965, now abandoned.

The present invention is directed to methods and apparatus for making phosphors which are differently responsive to electrons of different velocities (and thus are particularly useful in the above discussed color display systems), and also to novel viewing screens incorporating such phosphors. Referring to FIG. 1, a reactor or elongate chamber of a heat resistant material such as quartz is indicated by reference character 1. A charge 3 of phosphor particles is placed in a feed chamber 5 having a restricted opening 7 at the junction of a conduit 9. Oxygen is supplied to an inlet 11 and also to a tube 13, the latter gas being bubbled through a body 15 of tetraethoxysilane contained in a reservoir 17. As the oxygen from inlet 13 passes through the tetraethoxysilane the latter is vaporized and passes through a T 19 into conduit 9 where it mixes with the additional oxygen supplied at inlet 11. The passage of this oxygen-vaporized tetraethoxysilane mixture through conduit 9 past the restricted opening 7 effects entrainment of phosphor particles 3 which are swept into a mixing chamber 21 and move downwardly through a tube 23 into chamber 1. The composite gaseous medium and the suspended phosphor particles move through chamber 1 which is located in a heated insulated furnace 25. As the chamber is heated to an elevated temperature the particle surfaces will have a film of silicon dioxide deposited or condensed thereon from the vapor phase. The coated particles are discharged into a collection container 27, and the gas is vented at 29.

Particles of any of the conventional light emitting phosphors may have their electron energization threshold increased by subjecting them to the foregoing method. For example, particles of a cyan light emitting phosphor, $ZnSiO_4$ (Mn activated) having a size of about 3–10 microns were placed in chamber 5 and oxygen at the rate of 5 l./min. was supplied to inlet 11 while oxygen at the same rate was simultaneously supplied to inlet 13. The furnace was heated to a temperature sufficient to maintain reactor 1 and the gaseous mixture therein at a temperature of 500° C. The coated phosphor particles were transferred from container 27 to chamber 5 three times thereby effecting four passes of the phosphor particles through chamber 1. Thus a hard, thin dense silicon dioxide surface barrier layer was successively built up on each of the particles.

Figure 2:
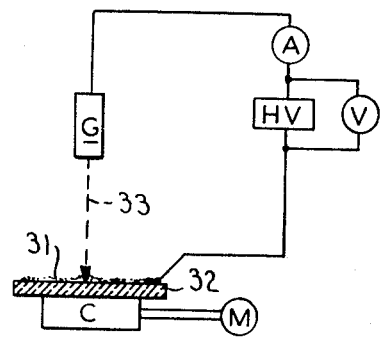
FIG. 2 is a schematic illustration of apparatus employed in evaluating and determining electron energization thresholds of phosphors.

FIG. 2 diagrammatically illustrates apparatus for determining and evaluating the silicon dioxide barrier layer thus formed. A thin layer 31 of coated phosphor particles is deposited on a glass slide 32 by any of the customary procedures. For example, 1¾ g. of the particles is suspended in 100 ml. of potassium silicate which suspension is then poured into 4 l. of water containing 50 ml. of 2% barium acetate solution. The phosphor particles will settle on a submerged glass slide and silicic acid (formed by the reaction of potassium silicate and barium acetate) will cause the particles to adhere to the glass slide. After evaporation by baking the slide at 400° (thereby forming amorphous silica which bonds the treated phosphor particles to the slide), it is exposed to an electron beam 33 generated by an electron gun G. A high voltage supply HV is connected between the phosphor layer-glass plate and the cathode of gun G to provide an electron accelerating voltage of variable magnitude measured by voltmeter V at a beam current indicated by ammeter A. The brightness of the light emitted by the phosphor being tested is measured in foot candles by a photocell C and a meter M.

Figure 3:
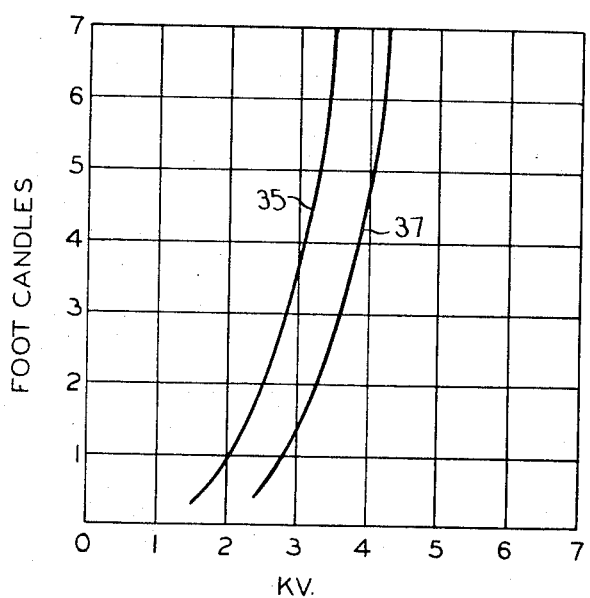
FIG. 3 is a graphical representation illustrating the increased electron energization threshold value of colored phosphor particles of this invention.

An untreated sample of the cyan phosphor was tested in the apparatus of FIG. 2 and, at a beam current of 10 microamperes, the response of this phosphor for various beam accelerating voltages was plotted as indicated by curve 35 in FIG. 3. Under the same conditions a sample of cyan phosphor particles having a barrier layer of silicon dioxide (formed as described above) was similarly tested and the response curve is shown at 37 in FIG. 7. As indicated by a comparison of curves 35 and 37, the barrier layer retards electron penetration or increases the energization threshold so that the electron beam velocity for the same luminosity or brightness must be increased by approximately 750 v.

These cyan light emitting phosphor particles may be applied randomly mixed together with red light emitting phosphor particles in a thin layer 36 (approximately one particle thick) to form a viewing screen on a glass face plate 38, as illustrated in FIG. 4. The phosphor particles are quite closely packed so as to be directly subjected sequentially in small domains to a narrow electron scanning beam 40. As each domain includes some of the red light emitting phosphors and some of the cyan phosphors with an increased electron energizaion threshold, only the red phosphors will emit light when struck by electrons of a relatively low velocity, while both the red and the cyan light emitting phosphors will be simultaneously energized by higher energy electrons and thus emit a white or substantially achromatic light.

Random mixtures of two or three types of phosphor particles of different energy threshold barriers may be economically applied to the interior of face plate 38 by flushing on the glass a thin liquid slurry of a homogeneous or random mixture of the differently responsive phosphor particles suspended in a suitable vehicle, followed by pouring off any excess and evaporation to form a thin dry layer of phosphor particles.

It will be noted that the particles of phosphor having the lowest energy threshold may or may not have a surface barrier layer and that, if desired, the differently responsive phosphor particles may be applied to the face plate in sequentially deposited thin layers, each layer being constituted by one type phosphor.

Ordinarily a continuous conducting film, of evaporated aluminum for example, would be added over the layer of phosphor particles. To this film an accelerating voltage is applied in the operation of the kinescope.

Another embodiment of apparatus of the present invention is illustrated in FIGS. 5 and 6. This apparatus includes a reactor or chamber 39, preferably of quartz, in which a charge 41 of phosphor particles, approximately 3–10 microns in size, is introduced. Reactor 39 is enclosed in an insulated heated furnace housing 43 which includes a first gas inlet 45, a second gas inlet 47, a gas outlet 49 and a product discharge vent 51.

Charge 41 of a cyan light emitting phosphor $ZnSiO_4$ (Mn activated) is placed in reactor 39 and oxygen at the rate of 5 l./min. is introduced at inlet 45. By the venturi or aspiration action as the oxygen gas stream passes a junction 53 of the lower restricted outlet of reactor 39 and a conduit 55, phosphor particles will be entrained in the gas stream and pass upwardly through a supply tube 57 to a T junction 59 with another conduit 61 connected to inlet 47. A gaseous mixture of oxygen and tetraethoxysilane is formed by bubbling oxygen through a body of the liquid silane and thereby entraining it in the gas stream. Five l./min. of this oxygen-tetraethoxysilane mixture is introduced into inlet 47 and intermixes with the phosphor-particle-carrying oxygen gas stream, the gas-phosphor mixture being discharged substantially tangentially into the upper portion of reactor 39. The phosphor particles swirl in a spiral path downwardly through the reactor, heated to a temperature of about 500° C., under which conditions a thin film of silicon dioxide is formed on the surface of each phosphor particle. After fifteen minutes of recycling the phosphor particles, they are removed from vent 51.

The apparatus of FIG. 2 was again used for comparatively testing the thus coated phosphor particles and an untreated sample of these phosphor particles, the test results showing that a surface barrier layer had been applied which increased the electron energization threshold by 1000 v.

Blue light emitting phosphor particles, ZnS (Ag activated) were similarly subjected to the method conditions substantially as described and it was determined that the electron penetration of these particles was retarded or the energization threshold was increased so that the electron beam velocity for the same luminosity or brightness must be increased by approximately 1500 v. By varying the time during which the phosphor particles were recycled through the apparatus of FIGS. 5 and 6, the electron retarding characteristics of the particle surface barrier layers can be accurately and reproducibly varied from values of a few hundred volts or less to several thousand volts, if desired.

It will be understood that any of the silanes or organic oxy compounds of silicon (such as other alkoxysilanes), which are volatile under the conditions of the process, may be used as a reactant in the foregoing methods. Examples of other equivalent silanes include ethyltrimethoxysilane, tetramethoxysilane, triethoxyethylsilane, triethoxymethylsilane, ethoxytriethylsilane and ethylorthosilicate.

Another method of increasing the electron energization threshold of phosphor particles is to form a surface barrier layer of aluminum oxide. For example, particles of a red light emitting phosphor, ZnS(20%)CdS(80%) (Ag activated), were subjected for five minutes to a gaseous mixture of oxygen (16 l./min.) and nitrogen bubbled at the rate of 4 l./min. through aluminum isopropylate (maintained at about 150° C.). This gaseous mixture was heated to a temperature of 500° C. and the vapor phase aluminum oxide thereby formed condensed on the surface of the particles to form a surface barrier layer of aluminum oxide approximately 1000 a. in thickness. It was determined by comparative testing that the electron energization had been increased approximately 2000 v. Other aluminum alkylates or organo aluminum compounds may be used as an equivalent of aluminum isopropylate, if desired.

It has been further found in accordance with this invention that by including in the particle's barrier layer a compound of a metal having a relatively high atomic number, preferably greater than that of silicon, relatively thin surface barrier layers can be formed which markedly increase the energization threshold of such phosphor particles. As an example of forming such coated phosphor particles, a composite layer of silicon dioxide and tin oxide has been formed on phosphor particles utilizing the apparatus illustrated in FIG. 7. An elongate reaction chamber 63, heated by an electrical coil 65 energized from any convenient source of electrical power L1–L2, is provided with three inlets 67, 69 and 71 and an outlet 73. A container 75 including a body 77 of tetraethoxysilane has oxygen, supplied at 79, bubbled through it thereby to entrain the vaporized silane. A further supply of oxygen is introduced at 81 and bubbled through a body 83 of anhydrous tin chloride thereby entraining it in a second gas stream which mixes with the gaseous oxygen-silane mixture at a T connection 85 and moves toward the chamber 63. An oxygen-entrained suspension of phosphor particles (preferably 3–10 microns in size) is introduced at inlet 71 and the gaseous medium of oxygen, tin chloride, tetraethoxysilane and the suspended phosphor particles pass through the heated reaction chamber 63 wherein vapor phase silicon dioxide and tin oxide will condense or deposit on the surfaces of the phosphor particles which are discharged at 73 into a collection container 87.

Particles of a blue light emitting phosphor, ZnS (Ag activated) were introduced in 5 l./min. of oxygen at inlet 71. Oxygen at the rate of 5 l./min. was also supplied at both 79 and 81. The temperature of the gaseous mixture was maintained at 500° C. The thus treated phosphor particles were passed through the chamber three more times thereby increasing the thickness of the composite silicon dioxide and tin oxide surwacee barrier layers. The final product was tested in the apparatus of FIG. 2 and the resulting barrier layer was found to provide an electron energization threshold of approximately 1500 v.

It was also noted that the electrical conductivity of these particles was enhanced which is advantageous in certain viewing screen applications where any significant charge buildup on the particles is to be avoided. It is to be understood that compounds of metals other than tin can be similarly applied as a surface barrier layer on phosphor particles. Such metals include phosphorus, arsenic, lead and gallium.

Figure 8:
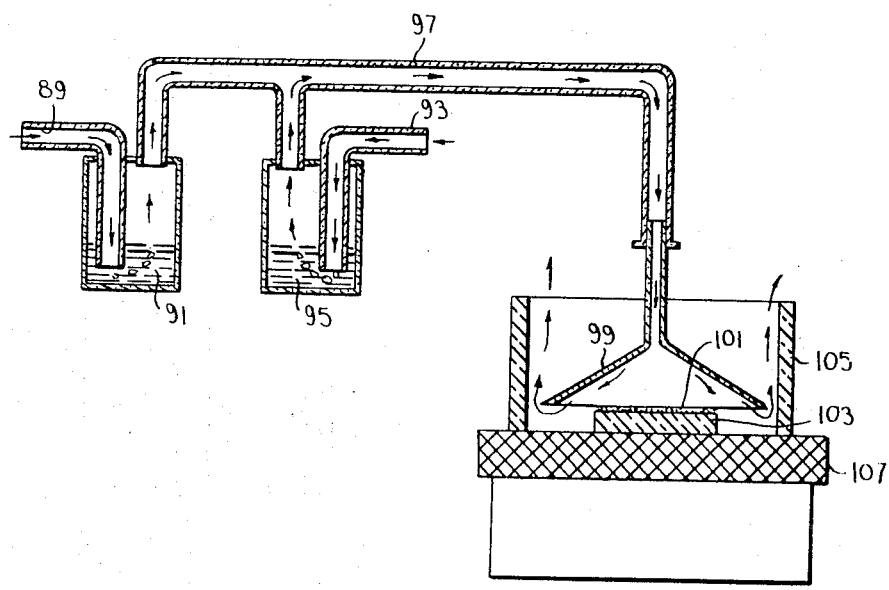
FIG. 8 illustrates additional apparatus for forming phosphor particles of this invention.

An energization threshold increasing barrier layer of tin oxide alone on phopshor particles was applied by employing the apparatus of FIG. 8. Oxygen at the rate of 1 l./min. was introduced at an inlet 89 and bubbled through a body 91 of water to form a gaseous mixture of oxygen and water vapor. Oxygen at the rate of 1 l./min. was also supplied at an inlet 93 and passed through a body 95 of anhydrous tin chloride, the oxygen-entrained tin chloride mixture intermixing in a conduit 97 with the oxygen-water mixture. This gaseous medium was passed downwardly through a hood 99 to impinge on a layer 101 of phosphor particles bonded to the upper surface of a slide 103. The slide and hood are surrounded by a quartz ring 105 and the slide and area within the ring were heated to a temperature of about 500° C. by an electric hot plate 107. Particles of a blue light emitting phosphor, ZnS (Ag activated) exposed or subjected to these conditions for ten minutes were found to have the electron energization threshold increased approximately 3000 v. by the tin oxide surface barrier layer thereby formed. This barrier layer also has good electrical conductivity characteristics and because of the relatively high atomic number tin forms a very effective surface barrier layer for increasing electron energization thresholds of phosphor particles. Oxides of germanium and indium may be used as the equivalents of tin oxides in the previous examples.

Figure 9:
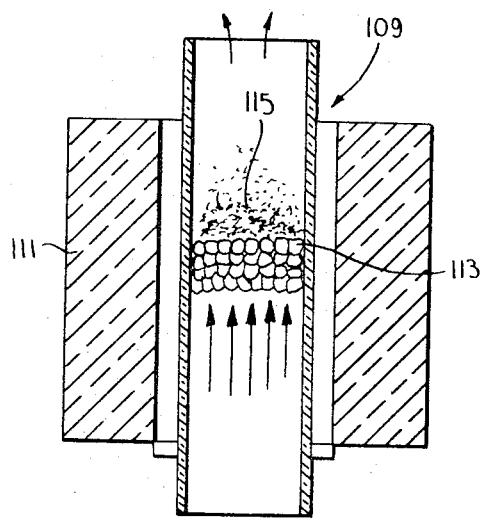
FIG. 9 illustrates still further apparatus employed in accordance with this invention.

The apparatus shown in FIG. 9 constitutes still another means for increasing the electron energization threshold of phosphor particles by suspending then in a gaseous medium including, in vapor phase, a material which coats phosphor particles with an electron retarding surface barrier. A reaction chamber 109 is positioned within an insulated furnace housing 111. A gaseous medium including a phosphor particle coating material in vapor phase is passed upwardly through a porous glass plug 113 of sintered frit material. A body 115 of phosphor particles is supported by the plug and the movement of the gaseous medium agitates and tends to hold suspended the phopshor particles as illustrated, thus effecting a deposition or condensation from the vapor phase material on the surfaces of the phosphor particles.

It will be noted that in methods of this invention in which phosphor particles are each individually coated by deposition of vapor phase material, the barrier layer thickness is a time-temperature function only and is not a function of particle size or distribution of particle size. Also, in accordance with this invention, phopshor particle electron retarding barrier layers may be provided by selective out-diffusion or in-diffusion of the phosphor impurities or activators. For example, phosphor particles (e.g., activated zinc tungstate, zinc silicate, zinc phosphate or calcium phosphate, etc.) treated at elevated temperatures in an atmosphere of vapor phase sulfur, oxygen, selenium, tellurium, etc. will undergo a chemical alteration of the surface layer of the phopshors to reduce the concentration of the activator at the surface of the particle, or will have formed thereon a surface layer of oxide, sulfide, etc.

Although various particular type phosphors were specified in describing the methods, apparatus and products of this invention, other types of phosphors, e.g., europium-activated yttrium ortho-vanadate, are also equivalent for the purposes of this invention. Similarly, the voltage energization levels and differentials noted herein are similarly exemplary and may be varied widely all in accordance with this invention.

In view of the above, it will be seen that the several objects of the invention are achieved and other advantageous results attained.

As various changes could be made in the above methods, constructions and products without departing from the scope of the invention, it is intended that all matter contained in the above description or shown in the accompanying drawings shall be interpreted as illustrative and not in a limiting sense.

What is claimed is:

1. In a color display system for producing colored images:
a viewing screen consisting of particles of a first phosphor which emit light of a first color when excited by a beam of electrons having a velocity of at least a first predetermined value, and particles of a second phosphor having a surface layer which constitutes a partial barrier to electrons whereby the second phosphor particles have a higher electron energization threshold than that of said first phosphor particles, said second phosphor particles emitting a second color light when excited by a beam of electrons having a velocity of at least a second predetermined value which is greater than said first value.

2. In a color display system for producing colored images as set forth in claim 1, said surface layer consisting of tin oxide.

3. In a color display system for producing colored images as set forth in claim 1, said surface layer consisting of aluminum oxide.

4. In a color display system for producing colored images as set forth in claim 1, said second phosphor particles each having a surface layer coating of silicon dioxide.

5. In a color display system for producing colored images as set forth in claim 1, said second phosphor particles each having a surface layer coating of silicon dioxide and an oxide of a metal selected from the group consisting of lead, gallium and tin.

6. In a color display system for producing colored images as set forth in claim 5, said compound being tin oxide.

References Cited
UNITED STATES PATENTS 3,113,929  12/1963  Koury _____ 252—301.6

ALFRED L. LEAVITT, Primary Examiner

W. F. CYRON, Assistant Examiner

U.S. Cl. X.R.

117—100